United States Patent
Seto et al.

(10) Patent No.: US 9,057,367 B2
(45) Date of Patent: Jun. 16, 2015

(54) COOLING DEVICE AND PROJECTOR

(75) Inventors: Takeshi Seto, Chofu (JP); Atsuya Hirabayashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 13/233,952

(22) Filed: Sep. 15, 2011

(65) Prior Publication Data

US 2012/0069305 A1    Mar. 22, 2012

(30) Foreign Application Priority Data

Sep. 21, 2010  (JP) .................................. 2010-210522
Sep. 21, 2010  (JP) .................................. 2010-210524
Apr. 28, 2011  (JP) .................................. 2011-100839

(51) Int. Cl.
  *G03B 21/16*  (2006.01)
  *F25D 15/00*  (2006.01)
  *F04B 43/04*  (2006.01)
  *H04N 9/31*  (2006.01)

(52) U.S. Cl.
  CPC .............. *F04B 43/046* (2013.01); *G03B 21/16* (2013.01); *H04N 9/3144* (2013.01)

(58) Field of Classification Search
  CPC ...... G03B 21/16; H04N 9/3144; F04B 43/04; F04B 43/043; F04B 43/046; F04B 43/08; F04B 43/09; F04B 43/095; F04B 23/00; F04B 53/1037; F04B 53/1047; F04B 39/0038
  USPC ........ 353/52, 54; 417/309, 410.1, 412, 413.1, 417/413.2, 413.3, 435; 165/104.11, 104.19, 165/104.28, 104.31, 104.32, 104.33
  See application file for complete search history.

(56) References Cited

U.S. PATENT DOCUMENTS

| | | | |
|---|---|---|---|
| 4,666,273 A * | 5/1987 | Shimizu et al. | 353/101 |
| 4,939,405 A * | 7/1990 | Okuyama et al. | 310/330 |
| 5,224,843 A * | 7/1993 | van Lintel | 417/413.2 |
| 5,535,818 A * | 7/1996 | Fujisaki et al. | 165/104.33 |
| 5,889,354 A | 3/1999 | Sager | |
| 6,431,694 B1 * | 8/2002 | Ross | 347/85 |
| 6,510,052 B2 * | 1/2003 | Ishikawa et al. | 361/679.47 |
| 6,666,658 B2 * | 12/2003 | Takeuchi et al. | 417/322 |
| 6,741,464 B2 * | 5/2004 | Kitano et al. | 361/679.53 |
| 6,987,668 B2 * | 1/2006 | Kitano et al. | 361/679.47 |
| 6,991,335 B2 * | 1/2006 | Kondo et al. | 353/54 |
| 7,011,507 B2 | 3/2006 | Seto et al. | |
| 7,094,040 B2 * | 8/2006 | Higashino et al. | 417/413.2 |
| 7,192,143 B2 * | 3/2007 | Fujimori et al. | 353/54 |

(Continued)

FOREIGN PATENT DOCUMENTS

| JP | 08-242463 | 9/1996 |
|---|---|---|
| JP | 01-15-2004 | 1/2004 |

(Continued)

*Primary Examiner* — John Lee
(74) *Attorney, Agent, or Firm* — Workman Nydegger

(57) ABSTRACT

A cooling device is provided. The cooling device may include a pump chamber, an inlet flow passage that is used for allowing a fluid to flow into the pump chamber, an outlet flow passage that allows the fluid to flow out from the pump chamber, a pump that includes a fluid resistance element that opens or closes the inlet flow passage between the inlet flow passage and the pump chamber, a circulation flow passage that is used for circulating the fluid from the outlet flow passage to the inlet flow passage, and a first volume adjusting chamber that adjusts pressure of the fluid flowing into the pump chamber.

12 Claims, 12 Drawing Sheets

(56) References Cited

U.S. PATENT DOCUMENTS

| | | | |
|---|---|---|---|
| 7,535,543 B2* | 5/2009 | Dewa et al. | 349/161 |
| 7,654,283 B2* | 2/2010 | Seto et al. | 137/515.5 |
| 7,862,181 B2* | 1/2011 | Lin et al. | 353/54 |
| 7,967,446 B2* | 6/2011 | Utsunomiya | 353/54 |
| 8,348,433 B2* | 1/2013 | Yanagisawa et al. | 353/54 |
| 8,371,829 B2* | 2/2013 | Jaeb et al. | 417/413.2 |
| 8,382,453 B2* | 2/2013 | Tomita et al. | 417/413.2 |
| 8,398,245 B2* | 3/2013 | Yanagisawa et al. | 353/54 |
| 8,721,060 B2* | 5/2014 | Yokoyama et al. | 347/89 |
| 8,734,139 B2* | 5/2014 | Burns et al. | 417/540 |
| 2002/0075645 A1* | 6/2002 | Kitano et al. | 361/687 |
| 2003/0017063 A1* | 1/2003 | Komatsu et al. | 417/413.2 |
| 2004/0233635 A1* | 11/2004 | Kitano et al. | 361/699 |
| 2005/0019180 A1 | 1/2005 | Seto et al. | |
| 2005/0117077 A1 | 6/2005 | Utsunomiya | |
| 2005/0175490 A1* | 8/2005 | Seto et al. | 417/559 |
| 2005/0244288 A1 | 11/2005 | O'Neill | |
| 2005/0265861 A1* | 12/2005 | Yamamoto et al. | 417/413.1 |
| 2005/0270495 A1* | 12/2005 | Ohkubo et al. | 353/54 |
| 2006/0279706 A1* | 12/2006 | Bash et al. | 353/54 |
| 2009/0009727 A1* | 1/2009 | Osumi | 353/54 |
| 2009/0035152 A1* | 2/2009 | Butterfield | 417/53 |
| 2009/0167109 A1* | 7/2009 | Tomita et al. | 310/317 |
| 2009/0196778 A1* | 8/2009 | Kitahara et al. | 417/540 |
| 2009/0237619 A1 | 9/2009 | Yanagisawa | |
| 2010/0021319 A1 | 1/2010 | Seto et al. | |
| 2010/0212639 A1* | 8/2010 | Nakane | 123/511 |
| 2010/0245778 A1* | 9/2010 | Yanagisawa et al. | 353/54 |
| 2012/0003107 A1* | 1/2012 | Burns et al. | 417/410.4 |
| 2012/0069305 A1* | 3/2012 | Seto et al. | 353/54 |

FOREIGN PATENT DOCUMENTS

| | | |
|---|---|---|
| JP | 2005-098263 | 4/2005 |
| JP | 2005-133704 | 5/2005 |
| JP | 2006-316785 | 11/2006 |
| JP | 31-036311 | 10/2007 |
| JP | 2010-209921 | 9/2010 |
| JP | 2010-242764 | 10/2010 |
| JP | 2011-052694 | 3/2011 |
| JP | 2011-052695 | 3/2011 |
| JP | 2011-058503 | 3/2011 |
| JP | 2011-058504 | 3/2011 |

* cited by examiner

SCHEMATIC DIAGRAM
OF SEALED SYSTEM CIRCULATION FLOW PASSAGE

DEVIATION OF FLUID
BEFORE AND AFTER PUMPING

COOLING DEVICE AND PROJECTOR

This application claims the benefit of priority to Japanese Application No. 2010-210522 filed Sep. 21, 2010, Japanese Application No. 2011-100839 filed Apr. 28, 2011, and Japanese Application No. 2011-210524 filed Sep. 21, 2010, which applications are incorporated by reference in their entirety.

BACKGROUND

1. Technical Field

Embodiments of the present invention relate to systems and methods for cooling a device. Embodiments of the invention more particularly relate to a cooling device and a projector and cooling the projector.

2. Related Art

Recently, small-sized cooling devices have been proposed that cool a device by absorbing the heat of a heat producing device using a liquid cooling medium.

For example, a projector may include a solid-state light emitting source that has high responsiveness for a supplied signal and superior dimmer control. While the amount of light emitted by a solid-state light emitting source (a heat producing body) increases in proportion to the amount of a supplied current, the amount of heat produced increases as well. Thus, a solid-state light emitting source is damaged or its lifetime is shortened due to the heat produced in a case where a large current is supplied to the solid-state light emitting source. Accordingly, technology for suppressing the damage to the solid-state light emitting source and lengthening the lifetime of the solid-state light emitting source by cooling the solid-state light emitting source is needed.

Conventionally, a cooling device includes a cooling medium that is used for cooling a heat producing source such as the solid-state light emitting source. A cooling medium cooling unit cools the cooling medium whose temperature is high due to absorption of the heat produced by the heat producing source.

For example, in JP-A-8-242463 discloses a technology for resolving uneven temperatures inside a cooling bath by constantly circulating a cooling liquid (cooling medium) using a circulation mechanism. By utilizing such a technology, a current or a voltage applied to a solid-state light emitting source can be raised, which raises the screen luminance, without destroying the solid-state light emitting source. Thus, an increase in the size of a projector device is not necessary. In addition, the liquid amount of the cooling liquid can be increased. Furthermore, the heat of the heated cooling liquid can be radiated to the outside with high efficiency using the cooling mechanism and the cooling efficiency can be improved.

In a liquid cooling jacket disclosed in JP-A-8-242463 that cools a semiconductor module disposed in an electronic apparatus or the like, a sealed-system circulation flow passage is formed which circulates cooling water in a sealed state to prevent leakage of the cooling water (see FIG. 12A). However, when a pump is operated, as shown in FIG. 12B, the volume of the sealed-system circulation flow passage expands based on deformation of a constituent element of the sealed-system circulation flow passage due to pressure raised in accordance with fluid resistance of the flow passage. The degree of the expansion on the upstream side (pump outlet-side flow passage side) is higher than that on the downstream side (pump inlet-side flow passage side) due to the influence of the addition of the flow resistance on the downstream side. Accordingly, when such driving is continued, the pressure applied at the supply side becomes negative pressure, and the pumping characteristics deteriorate. As a result, the pump cannot stably circulate the cooling water, and there is a concern that it will become difficult to stably cool a heat producing device.

The degree of the expansion is discussed below.

First, the amount of increase in the volume of the entire flow passage system at the time of applying constant pressure $\Delta P$ to the entire circulation flow passage system is assumed to be $\Delta V$.

Next, a pressure difference between the pressure at the upstream side and the pressure at the downstream side in a case where a fluid of a desired flow amount flows in the circulation flow system is assumed to be Ps. Toward the downstream side of the circulation flow passage, the pressure of the inside of the circulation flow passage decreases so as to be Ps=0 at the pump inlet-side flow passage. At this time, in a case where the amount of the fluid in the entire circulation flow passage is constant, the circulation flow passage is deformed on the upper stream side of the circulation flow passage so as to increase the volume Vd. Accordingly, the fluid is insufficient on the downstream side and results in a negative pressure state.

Systems and methods for maintaining the pressure at the pump inlet-side flow passage to be the same as that before driving the pump without generating negative pressure is needed.

SUMMARY

An advantage of some aspects of the invention is to solve at least a part of the problems described above, and embodiments of the invention can be implemented according to the following forms or application examples.

Application Example 1

This application example of the invention is directed to a cooling device including: a pump chamber of which a volume can be changed by driving a piston or a movable wall; an inlet flow passage that configured to allow a fluid to flow into the pump chamber; an outlet flow passage configured to allow the fluid to flow out from the pump chamber; a pump that includes a fluid resistance element configured to open or close the inlet flow passage between the inlet flow passage and the pump chamber; a circulation flow passage configured to circulate the fluid from the outlet flow passage to the inlet flow passage; and a first volume adjusting chamber configured to adjust a pressure of the fluid flowing into the pump chamber. Assuming that a pressure change of the fluid in the circulation flow passage is $\Delta P$, a volume change of the circulation flow passage at that time is $\Delta V$, and pressure of the fluid of the outlet flow passage-side circulation flow passage at the time of circulating the fluid is $P_S$, an adjustment volume of the first volume adjusting chamber is an adjustment volume $V_B$ that satisfies Equation (1).

$$V_B > \tfrac{1}{2} \cdot P_S \cdot \Delta V / \Delta P \tag{1}$$

By attaching the first volume adjusting chamber to the inlet flow passage side of the circulation flow passage, the pressure at the inlet flow passage and the pressure at the outlet flow passage due to pump driving become almost the same. Accordingly, a deviation of the fluid volume in the circulation flow passage before and after pumping due to deformation of a constituent element of the circulation flow passage system does not occur. Therefore, the fluid can be stably circulated, and a heat source can be stably cooled.

Application Example 2

This application example of the invention is directed to the above-described cooling device. In this application example, the first volume adjusting chamber includes a pressure adjusting device configured to adjust the volume of the first volume adjusting chamber. The pressure adjusting device is formed by a member having elasticity.

According to this application example, the volume of the volume adjusting chamber can be easily adjusted through elastic deformation.

Application Example 3

This application example of the invention is directed to the above-described cooling device. This application example includes a second volume adjusting chamber configured to adjust the pressure of the fluid flowing out from the pump chamber on the outlet flow passage-side circulation flow passage.

According to this application example, the second volume adjusting chamber absorbs a pulsatile flow on the outlet flow passage side and the liquid can be allowed to stably flow out.

Application Example 4

This application example of the invention is directed to the above-described cooling device. In this application example, the first and second volume adjusting chambers communicate with each other.

According to this application example, since the first and second volume adjusting chambers communicate with each other, a balance therebetween can be acquired even in a case where the internal fluid decreases.

Application Example 5

This application example of the invention is directed to the above-described cooling device. In this application example, the first and second volume adjusting chambers may be disposed in a parallel pattern or a serial pattern.

According to this application example, the volume adjusting chambers can be easily arranged inside the cooling device.

Application Example 6

This application example of the invention is directed to the above-described cooling device. In this application example, at least one of the first and second volume adjusting chambers has an expandable and contractible structure.

According to this application example, the volume adjusting chambers can be easily configured based on the expandable and contractible structure.

Application Example 7

This application example of the invention is directed to a projector including the above-described cooling device.

According to this application example, by cooling the solid-state light emitting source with the cooling device, the solid-state light emitting light source can be suppressed from being destroyed by the heat thereof. Accordingly, the current or the voltage applied to the solid-state light emitting light source can be raised, and the screen luminance can be raised accordingly. By efficiently radiating the heat of the heated cooling liquid to the outside using the cooling mechanism, the efficiency of cooling the cooling liquid can be improved.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
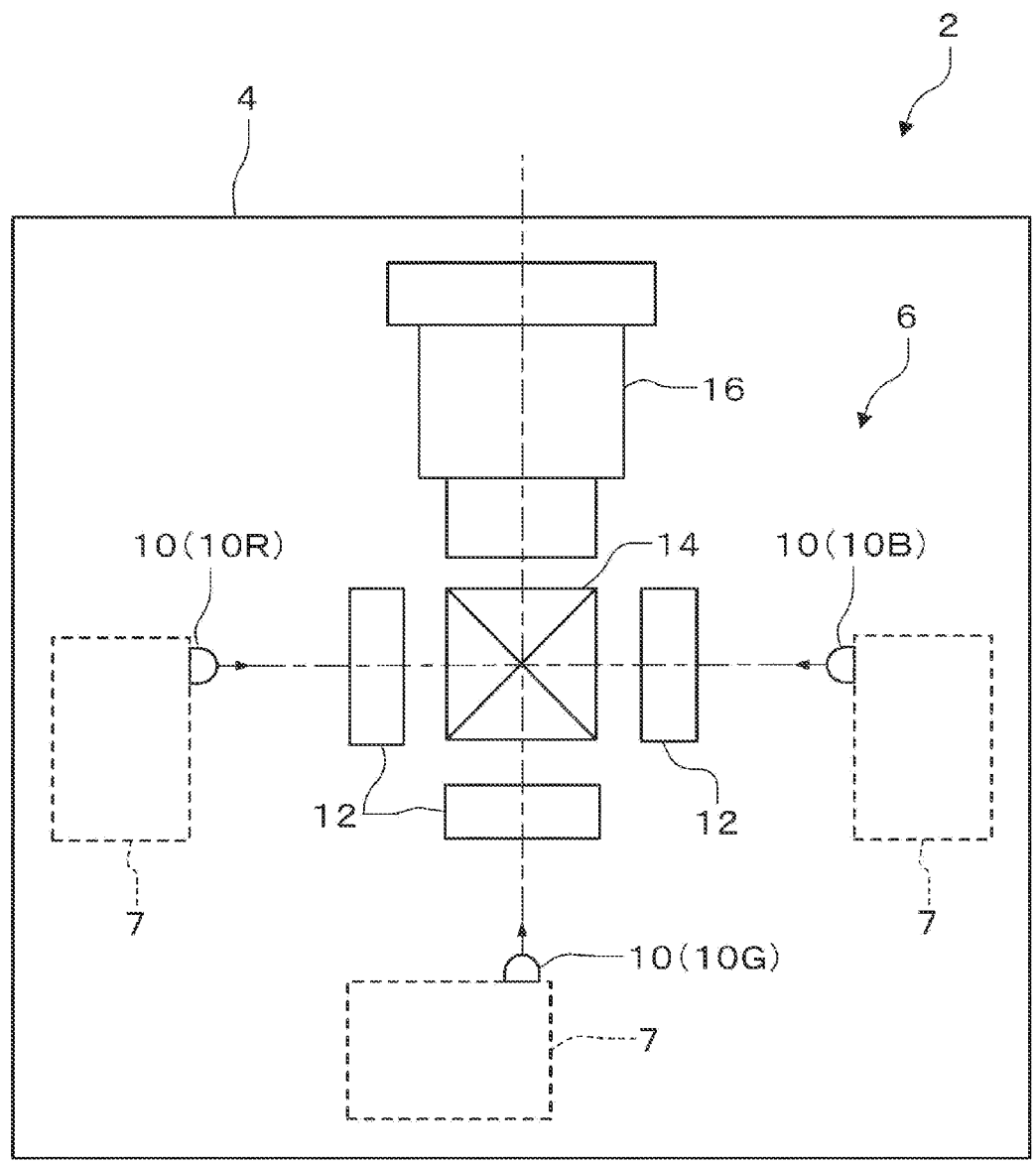
FIG. 1 is a schematic diagram schematically showing the configuration of a projector according to a first embodiment.

Hereinafter, a cooling device and a projector according to embodiments and a cooling method according to an embodiment will be described. In the drawings described below, in order to allow each member to have a recognizable size, the scale of each member is appropriately changed.

First Embodiment

Configuration of Projector

FIG. 1 is a schematic diagram schematically showing a configuration of a projector 2 according to a first embodiment. The projector 2 according to this embodiment forms an optical image by modulating luminous fluxes emitted from a light source in accordance with image information. The projector 2 projects the formed optical image on a screen (not shown) in an enlarged scale. This projector 2 is mainly configured by an exterior casing 4, an optical device 6, and a cooling system (cooling device) 7.

Although not shown in FIG. 1, a power source unit that supplies power to constituent members of the projector 2, a control device that controls the overall operation of the projector 2, and the like are arranged in a space other than the optical device 6 and the cooling system 7 inside the exterior casing 4.

The exterior casing 4 is a casing that houses and arranges the optical device 6, the cooling system 7, and the like on the inside thereof. Although not shown in FIG. 1, in this exterior casing 4, an inlet port that introduces external air into the inside of the projector 2 and an outlet port that discharges air that is warmed inside of the projector 2 to the external air are formed.

The optical device 6 forms an optical image (color image) in accordance with image information by optically processing the luminous fluxes emitted from a light source and projects the formed color image in an enlarged scale. As shown in FIG. 1, this optical device 6 includes a light source device 10 as a heat producing body, three liquid crystal light valves 12 as optical modulation devices, a cross dichroic prism 14 as a color-composing optical device, and a projection lens 16 as a projection optical device.

The light source device 10 may be turned on and emits luminous fluxes toward the liquid crystal light valve 12 under the control of the control device. As shown in FIG. 1, the light source device 10 includes a light source device for each component color (e.g., red (10R), green (10G) and blue (10B). More specifically, the light source device 10 is configured with a R color light LED (Light Emitting Diode) module 10R that emits R color light, a G color light LED module 10G that emits G color light, and a B color light LED module 10B that emits B color light.

The LED modules 10R, 10G, and 10B have approximately the same configuration. Although not shown in detail in the figure, in each LED module, a plurality of LED elements configured as solid-state emitting devices may be arranged on a Si (Silicon) substrate or other appropriate material. The LED elements configuring the LED modules 10R, 10G, and 10B are formed such that the types of crystals, additives, and the like are different from one another in order to emit R color light, G color light, and B color light.

The light source device 10 is not limited to the configuration having the above-described LED modules and may employ other configurations having various solid-state light emitting devices such as laser diodes, organic EL (Electro Luminescence) devices, and silicon light emitting devices.

The three liquid crystal light valves 12 may be transmissive-type liquid crystal panels. The liquid crystal light valves 12 emit optical images according to image information to the cross dichroic prism 14 by changing the arrangement of liquid crystal molecules enclosed in liquid crystal cells (not shown) based on a driving signal transmitted from the control device and transmitting or blocking color light emitted from each LED module 10R, 10G, and 10B.

The cross dichroic prism 14 is an optical device that forms a color image by composing optical images modulated for the color light emitted from each liquid crystal light valve 12. This cross dichroic prism 14 forms an approximately square shape, which is acquired by bonding four right-angled prisms together, in the plan view. On the boundary faces formed by bonding the right-angled prisms, two dielectric multilayer films are formed. The dielectric multilayer films reflect the color light emitted from the liquid crystal light valves 12 facing each other and transmit the color light emitted from the liquid crystal light valve 12 facing the projection lens 16. As above, the color light modulated by each liquid crystal light valve 12 is composed together so as to form a color image.

The projection lens 16 is configured by a set of lenses acquired by bonding a plurality of lenses together. The projection lens 16 projects the color image output from the cross dichroic prism 14 on a screen not shown in the figure in an enlarged scale.

Between the light source device 10 and the liquid crystal light valve 12, another optical device, for example, a polarization converting device that aligns the polarized direction of the color light emitted from the light source device 10 so as to form light that is linearly polarized in approximately one direction, a rod integrator that makes the in-plane luminance of the color light emitted from the light source device 10 uniform, or a uniform illumination optical device such as a lens array, in which a plurality of small lenses is arranged in a matrix pattern, may be arranged.

The cooling system 7, to be described later in detail, is a device that cools the LED modules 10R, 10G, and 10B with a cooling medium X by circulating the cooling medium (fluid) X. In this embodiment, although the cooling system 7 is configured so as to cool the LED modules 10R, 10G, and 10B, the invention is not limited thereto. Thus, the cooling system 7 may be configured so as to cool other constituent members inside the projector 2 such as the liquid crystal light valves 12.

As shown in FIG. 1, three cooling systems 7 are configured in cooperation with the LED modules 10R, 10G, and 10B. Since the three cooling systems 7 have the same configuration, only one cooling system 7 will be described.

Configuration of Cooling System

Figure 2:
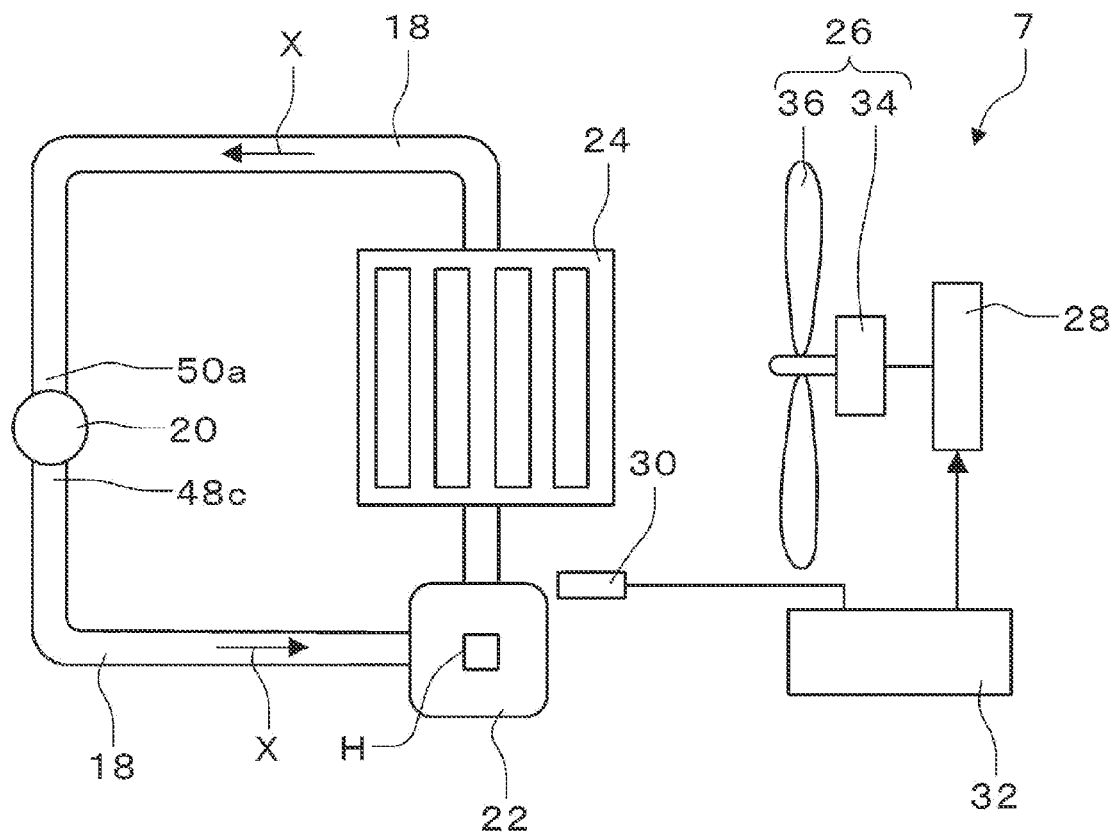
FIG. 2 is a schematic diagram schematically showing the configuration of a cooling system according to the first embodiment.

FIG. 2 is a schematic diagram schematically showing the configuration of the cooling system 7 according to this embodiment. The cooling system 7 according to this embodiment is used for cooling a heat producing body H through the cooling medium X. The cooling system 7, as shown in FIG. 2, is configured so as to include a fluid flow member (tube) (circulation flow passage) 18, a pump 20, a heat receiving unit 22, a heat radiating unit 24, a cooling medium cooling unit 26, a motor control unit 28, a temperature sensor 30, and a temperature managing unit 32. As the cooling medium X of this embodiment, a liquid is used.

The fluid flow member 18 forms a circulation flow passage of the cooling medium X and is set so as to have a circular shape in this embodiment. At positions located in the middle of the fluid flow member 18, the pump 20, the heat receiving unit 22, and the heat radiating unit 24 are arranged. The fluid flow member 18 circulates a fluid from an outlet connection pipeline 48c to an inlet flow passage 50a.

The pump 20 allows the cooling medium X located inside the fluid flow member 18 to flow.

The heat receiving unit 22 is disposed so as to be brought into contact with the heat producing body H and may be formed from a material such as metal that has a high heat-transfer coefficient. As the heat of the heat producing body H is absorbed by the cooling medium X in the heat receiving unit 22, the heat producing body H is cooled.

The heat radiating unit 24 is used for radiating the heat of the cooling medium X. The temperature of the cooling medium X is high or increased due to absorption of the heat from the heat producing body H. The heat radiating unit 24 is configured as a radiator in this embodiment.

The cooling medium cooling unit 26 is used for cooling the cooling medium X and, in this embodiment, is configured to include a cooling fan that includes a fan driving motor 34 and a fan 36.

The fan driving motor 34 is a motor that is used for driving the fan 36. As the fan 36 is driven so as to rotate by the fan driving motor 34, wind is generated so as to radiate the heat of the cooling medium X through the heat radiating unit 24. In this manner, the cooling medium X is cooled.

The motor control unit 28 controls the cooling medium cooling unit 26 based on a signal supplied to the motor control unit 28. To be more specific, the motor control unit 28 controls the number of revolutions of the fan 36 by controlling the fan driving motor 34 in this embodiment.

The temperature sensor 30 is disposed at a position at which the temperature of the heat producing body H can be measured. The temperature sensor 30 is connected to the temperature managing unit 32.

The temperature managing unit 32 supplies a signal to the motor control unit 28 based on a measurement signal supplied from the temperature sensor 30.

Next, the operation (cooling method) of the cooling system 7 according to this embodiment having the above-described configuration will be described. In the cooling system 7 according to this embodiment, it is assumed that the pump 20 is constantly driven, and that the cooling medium X circulates inside the fluid flow member 18.

The cooling medium X absorbs heat from the heat producing body H in the heat receiving unit 22 in the process of circulating in the inside of the fluid flow member 18. The cooling medium X is cooled by radiating the heat that has been absorbed from the heat producing body H from the heat radiating unit 24. The cooling medium X is circulated again, and absorbs the heat from the heat producing body H in the heat receiving unit 22.

The current temperature status of the heat producing body H is input to the temperature managing unit 32 through the temperature sensor 30. Then, the current temperature status is supplied to the motor control unit 28 as a signal.

Configuration of Pump

Figure 3A:
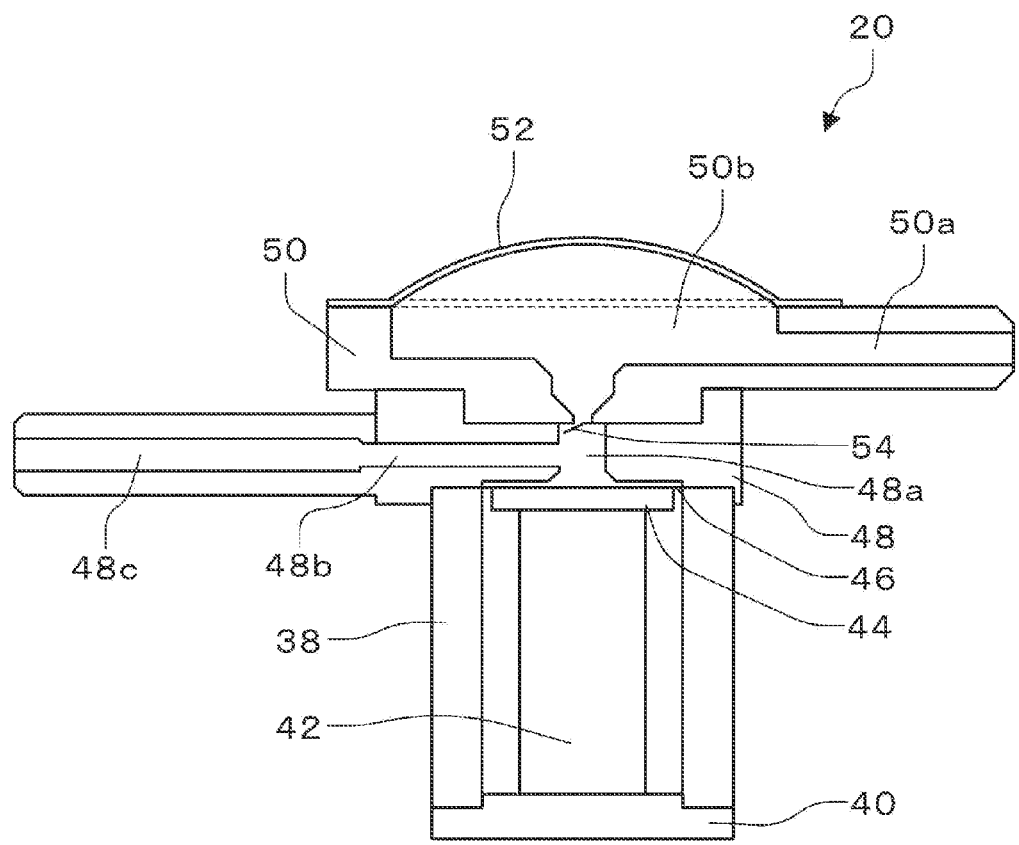
FIGS. 3A and 3B are a cross-sectional view and a plan view of a pump according to the first embodiment.
Figure 3B:
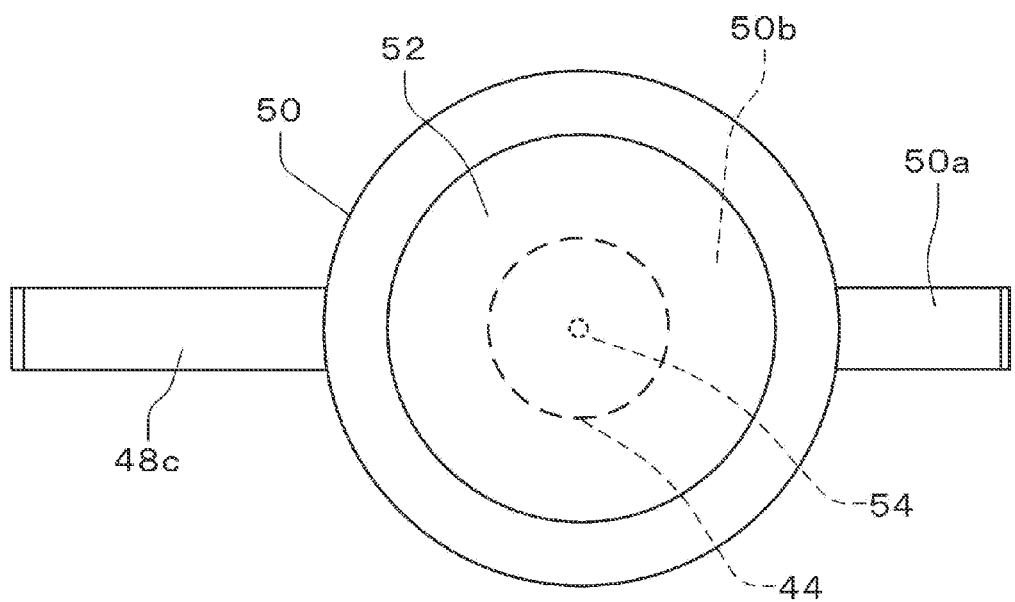

FIGS. 3A and 3B are a cross-sectional view and a plan view of the pump 20 according to this embodiment. As shown in FIG. 3A, a base plate 40 may be firmly fixed by welding to a lower portion of a casing 38. The casing 38 may be a holding member for a lamination type piezoelectric device 42. A reinforcing plate 44 is bonded to an upper face of the lamination-type piezoelectric device 42 as a driving source of the pump in advance so as to form a lamination-type piezoelectric device unit. The lamination-type piezoelectric device 42 is fixed to the inside of the casing 38. The lamination-type piezoelectric device 42 may be fixed by bonding the lower face of the lamination-type piezoelectric device 42 and the upper face of the base plate 40 together.

After the lamination-type piezoelectric device 42 is fixed, the upper face of the casing 38 and the upper face of the reinforcing plate 44 are processed so as to be in the same plane through a grinding process. When the above-described processing is performed, a center value of a driving voltage for the lamination-type piezoelectric device 42 at the time of being driven is applied to the lamination-type piezoelectric device 42. Accordingly, there is a level difference between the upper faces of the lamination-type piezoelectric device 42 and the reinforcing plate 44 in a state in which a voltage is not applied to the lamination-type piezoelectric device 42.

After the grinding process, a diaphragm 46 is bonded to both the reinforcing plate 44 and the casing 38. While the diaphragm 46 may be formed by a stainless steel thin plate having a thickness of 20 μm in one example (other thicknesses are within the scope of the invention), a resin film is attached to the upper face of the thin plate located on the side opposite to the lower face that is bonded to the reinforcing plate 44 and the casing 38. A pump chamber member 48 is mounted such that the diaphragm 46 is interposed between the casing 38 and the pump chamber member 48. The casing 38 may be formed such that the casing 38 is slightly larger than the shape of the inner circumferential portion of the outer circumferential fixing portion of the diaphragm 46 of the pump chamber member 48.

On the inside of the pump chamber member 48, a pump chamber 48a, a tubule portion 48b, and an outlet connection pipeline (outlet flow passage) 48c are formed. The casing 38 and the pump chamber member 48 are fixed or attached to one another through a screw or other suitable connection. In the upper portion of the pump chamber member 48, an inlet flow passage member 50 is fitted and is fixed by a screw not shown in the figure. The volume of the pump chamber 48a is changed by driving the diaphragm 46. The outlet connection pipeline 48c allows fluid to flow out from the pump chamber 48a.

The upper face of the inlet flow passage member 50 that is open is sealed by a pressure adjusting plate (pressure adjusting element) 52 that is flexible and has a high gas barrier property. The pressure adjusting plate 52 adjusts the volume of a volume adjusting chamber (first volume adjusting volume) 50b that is a high capacity buffer. The pressure adjusting plate 52 adjusts the volume of the volume adjusting chamber 50b by changing the surface area thereof. The pressure adjusting plate 52 may be formed by a member having elasticity. As the material of the pressure adjusting plate 52, in order to acquire both flexibility and the gas barrier property, a composite material of a metal (for example, stainless steel, aluminum, or the like) thin film and a resin is preferably used. The material of the pressure adjusting plate 52 may be a metal film. Furthermore, the material of the pressure adjusting plate 52 may be a soft tube acquired by attaching a PVC film to the ceiling of the volume adjusting chamber 50b or a silicon resin. On the surface of the pressure adjusting plate 52, a fold that is expanded and contractible or a concentric ripple shape may be formed, or the surface of the pressure adjusting plate 52 may be formed to have a bellows structure. The bellows structure may be formed in a spiral shape or as independent bellows.

The volume adjusting chamber 50b is included in the inlet flow passage 50a. The volume adjusting chamber 50b adjusts the pressure of a fluid flowing into the pump chamber 48a. The adjustment volume of the volume adjusting chamber 50b is an adjustment volume $V_B$ that satisfies Equation (2), assuming that a pressure change of the fluid of the (entire) fluid flow member 18 is $\Delta P$, a volume change of the (entire) fluid flow member 18 at that time is $\Delta V$, and the pressure of the fluid on the outlet connection pipeline 48c side of the fluid flow member 18 at the time of circulating the fluid is $P_S$.

$$V_B > 1/2 \cdot P_S \cdot \Delta V / \Delta P \qquad (2)$$

The volume adjusting chamber 50b has a function of stably supplying the cooling medium X to the pump chamber 48a. The cross-section of the volume adjusting chamber 50b may be larger than the diameter of reinforcing plate 44 bonded to the diaphragm 46 as long as the volume adjusting chamber 50b satisfies the adjustment volume $V_B$. The shape of the volume adjusting chamber 50b in the plan view has an approximately circular shape having a check valve 54 as its center (see FIG. 3B) in this example. The shape of the volume adjusting chamber 50b is not particularly limited and, for example, may be a polygon such as a triangle or a rectangle in the plan view.

Although not shown in the figure, the volume adjusting chamber 50b may be formed in a ring shape. In such a case, the tubule portion 48b and the outlet connection pipeline 48c can be extracted from a space in the ring shape. The diameter of the ring-shaped volume adjusting chamber 50b may be larger than the diameter of the reinforcing plate 44 bonded to the diaphragm 46. For example, the size of the diameter of the volume adjusting chamber 50b may be twice as large as the reinforcing plate 44 or greater.

The check valve 54 is disposed between the inlet flow passage 50a and the pump chamber 48a and opens or closes the inlet flow passage 50a.

The inlet flow passage 50a allows a fluid to flow into the pump chamber 48a. An input pipeline that is not shown in the figure is connected to a protruded portion of the inlet flow passage member 50 in which the inlet flow passage 50a is disposed. Similarly, an outlet pipeline that is not shown in the figure is connected to a protruded portion of the pump chamber member 48. The inlet pipeline and the outlet pipeline are configured by resin tubes having appropriate flexibility or the like. The tube may have a heat resistance.

Next, a flow passage located inside the pump according to this embodiment will be described. The fluid flowing from the inlet pipeline that is not shown in the figure flows from the volume adjusting chamber 50b into the pump chamber 48a. The flow passage to the pump chamber 48a of the volume adjusting chamber 50b gradually decreases so as to have a hole of about ϕ0.5 mm, in one example, and connects with the pump chamber 48a. In a boundary portion between the volume adjusting chamber 50b and the pump chamber 48a, a check valve (fluid resistance element) 54 that is formed by a stainless steel thin plate having a thickness of 15 in this example, is installed and prevents a reverse flow from the pump chamber 48a to the volume adjusting chamber 50b.

The pump chamber 48a is configured by a connection portion at which the tubule portion 48b is open and a flat-shaped compressed portion of the upper portion of the diaphragm 46. The fluid flowing out from the pump chamber 48a is delivered to the connection pipeline, which is not shown in the figure, through the tubule portion 48b and the outlet connection pipeline 48c.

Operation of Pump

The operation of the pump 20 according to this embodiment will be described. An inertance value L of a flow passage will be defined. Assuming that the cross-sectional area of a flow passage is S, the length of the flow passage is 1, and the density of the operating fluid is ρ, the inertance value L is given as $L=\rho \times l/S$. In a case where differential pressure of the flow passage is ΔP and the flow amount flowing through the flow passage is Q, by transforming an equation of motion of the fluid inside the flow passage using the inertance value L, a relationship of $\Delta P = L \times dQ/dt$ is derived.

In other words, the inertance value L represents the degree of influence of unit pressure on a time change in the flow amount. Thus, the larger the inertance value L is, the less the time change in the flow amount is. On the other hand, the smaller the inertance value L is, the greater the time change in the flow amount is.

A combined inertance value relating to a parallel connection of a plurality of flow passages or a serial connection of a plurality of flow passages having different shapes may be calculated by combining inertance values of individual flow passages similarly to a parallel connection or a serial connection of inductors in an electric circuit. To be more specific, a combined inertance value in a case where a plurality of flow passages are connected in parallel can be acquired by combining individual inertance values similarly to a case where inductors are connected in parallel in an electric circuit. On the other hand, a combined inertance value in a case where a plurality of flow passages having different shapes are connected in series can be acquired by combining individual inertance values similarly to a case where inductors are connected in series in an electric circuit.

In a case where there is a pressure adjusting element such as a flexible unit in a flow passage, the combined inertance value may be calculated in consideration of the pressure adjusting element. Accordingly, in the pump according to this embodiment, the combined inertance value of the inlet flow passage is a combined inertance value from the pressure adjusting plate 52 as the pressure adjusting element to the check valve 54. On the other hand, the combined inertance value of the outlet flow passage is a sum of the inertance value of the tubule portion 48b and inertance value of the outlet connection pipeline 48c. Since the length of the flow passage of the outlet flow passage is longer than that of the inlet flow passage, and the cross-sectional area of the flow passage of the outlet flow passage is smaller than that of the inlet flow passage, the combined inertance value of the outlet flow passage is larger than that of the inlet flow passage.

Second Embodiment

Configuration of Cooling System

Figure 4:
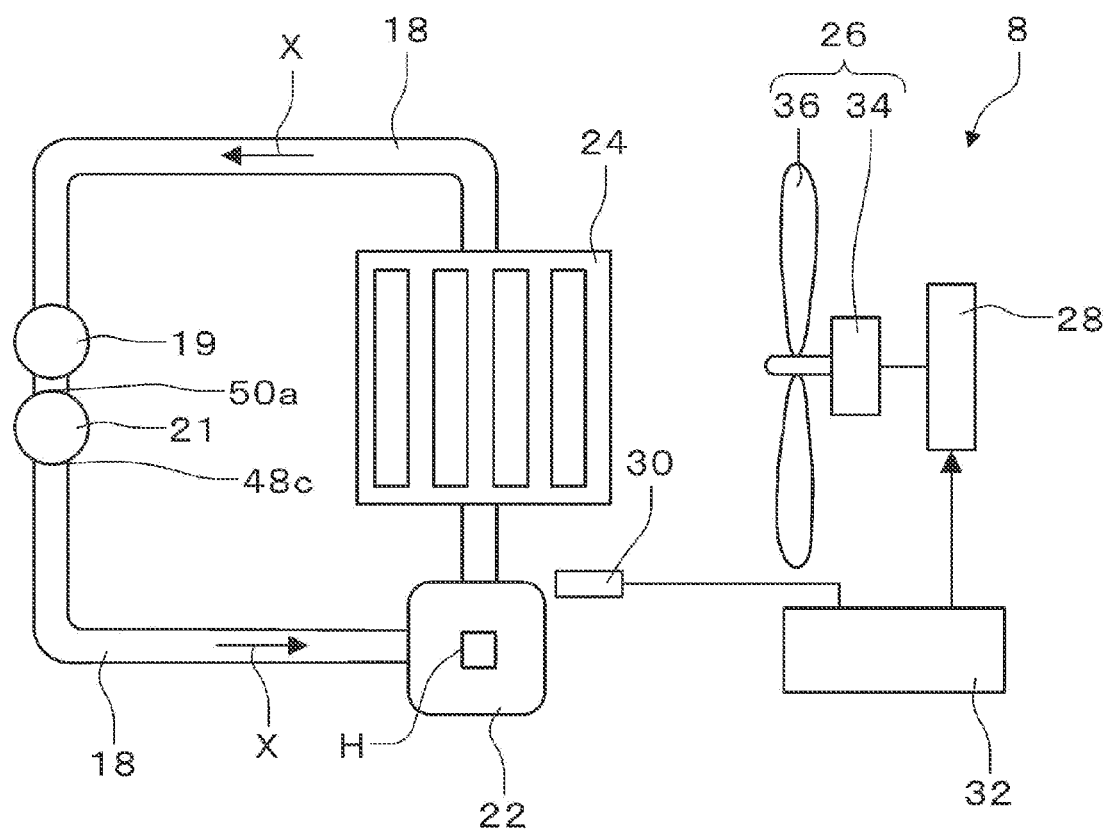
FIG. 4 is a schematic diagram schematically showing the configuration of a cooling system according to a second embodiment.

FIG. 4 is a schematic diagram schematically showing the configuration of a cooling system 8 according to this embodiment. In the description of this embodiment, the same reference numerals are assigned to the same configuration as that of the first embodiment, and the description thereof is omitted.

An inlet flow passage-side volume adjusting chamber (first volume adjusting chamber) 19 is disposed on the inlet flow passage 50a side of the fluid flow member 18. The inlet flow passage-side volume adjusting chamber 19 stabilizes the pressure of the cooling medium X that flows into the pump chamber 48a. The inlet flow passage-side volume adjusting chamber 19 has a structure that is expandable and contractible.

Inlet Flow Passage-Side Volume Adjusting Chamber

Figure 5:
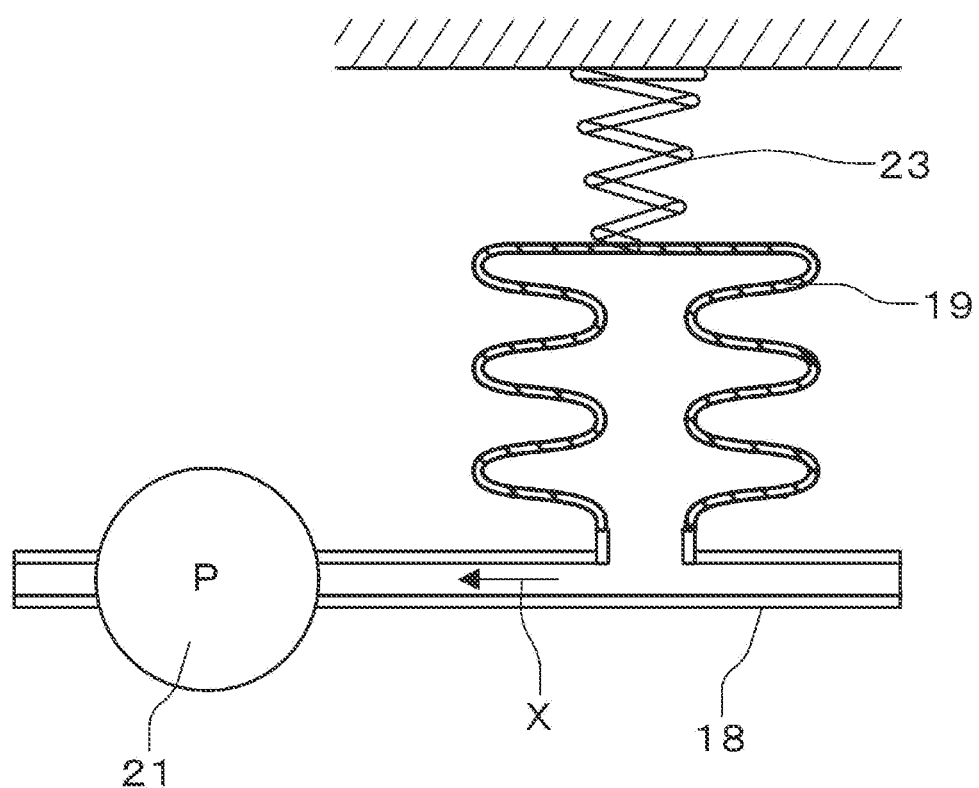
FIG. 5 is a cross-sectional view showing an inlet flow passage-side volume adjusting chamber according to the second embodiment.

FIG. 5 is a cross-sectional view showing the inlet flow passage-side volume adjusting chamber 19 according to this embodiment. The inlet flow passage-side volume adjusting chamber 19 is configured so as to be expandable and contractible. The inlet flow passage-side volume adjusting chamber 19 is configured by a member of metal or the like and has a shape having rotational symmetry with respect to a central axis along the direction of expansion and contraction (the vertical direction in FIG. 5). The inlet flow passage-side volume adjusting chamber 19, as shown in FIG. 5, can allow a cooling liquid X to flow through the inside thereof and is connected to the fluid flow member 18. A material is preferably used as the material of the inlet flow passage-side volume adjusting chamber 19 which has high air-tightness and in which the cooling liquid X located inside is not volatized. The inlet flow passage-side volume adjusting chamber 19 is connected to a spring 23 in a state in which an end portion connected to the fluid flow member 18 and an opposite end are sealed. The inlet flow passage-side volume adjusting chamber 19 is driven so as to be expanded or contracted by the pressure inside the fluid flow member 18.

The spring 23 is a member that is connected to an end of the inlet flow passage-side volume adjusting chamber 19 that is connected to the fluid flow member 18 and the opposite end thereof, is configured so as to be vertically expandable and contractible in FIG. 5, and presses the inlet flow passage-side volume adjusting chamber 19 by being expanded or contracted. The spring 23 is expanded or contracted in the vertical direction in FIG. 5. One end portion of the spring 23 in the displacement direction is connected to the inside of the projector 2, and the other end portion thereof is connected to the inlet flow passage-side volume adjusting chamber 19.

The fluid flow member 18 is connected to the inlet flow passage-side volume adjusting chamber 19 so as to allow the cooling liquid X to flow therein. This fluid flow member 18 is disposed in a state of being fixed to the inside of the projector 2. The inlet flow passage-side volume adjusting chamber 19, as shown in FIG. 5, for example, is in the state which the central axis is toward the vertical direction by being connected to the fluid flow member 18.

The adjustment volume of the inlet flow passage-side volume adjusting chamber 19 is an adjustment volume $V_B$ that satisfies Equation (3), assuming that a pressure change of the fluid of the (entire) fluid flow member 18 is ΔP, a volume change of the (entire) fluid flow member 18 at that time is ΔV, and the pressure of the fluid on the outlet connection pipeline 48c side of the fluid flow member 18 at the time of circulating the fluid is $P_S$.

$$V_B > \tfrac{1}{2} \cdot P_S \cdot \Delta V / \Delta P \quad (3)$$

Next, the operation of the above-described inlet flow passage-side volume adjusting chamber 19 will be described.

Figure 6A:
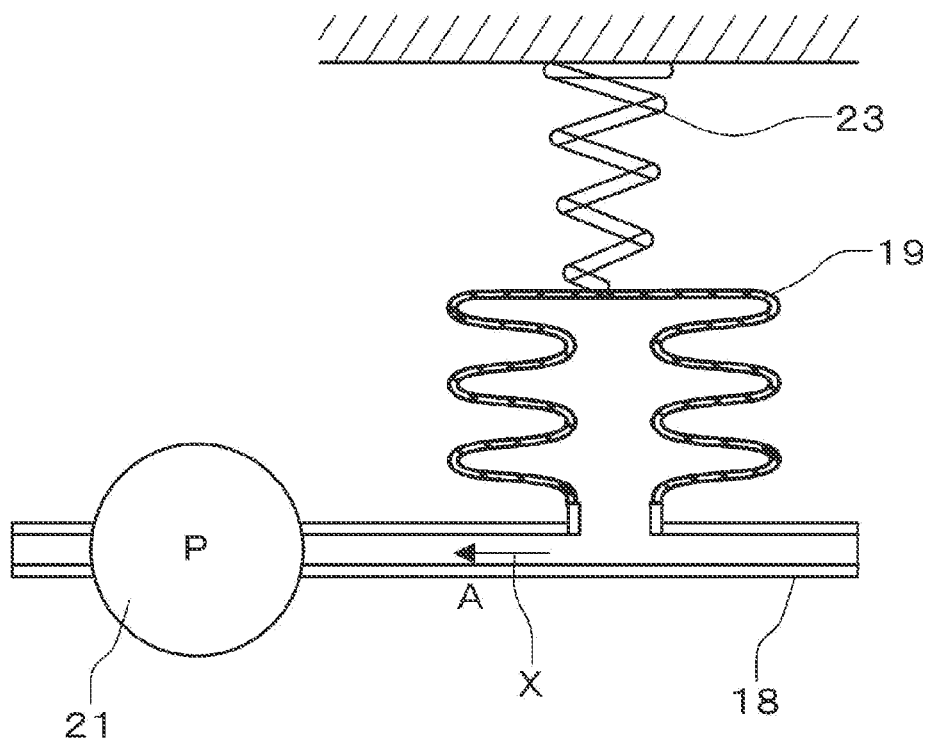
FIGS. 6A and 6B are cross-sectional views illustrating the operation of the inlet flow passage-side volume adjusting chamber according to the second embodiment.
Figure 6B:
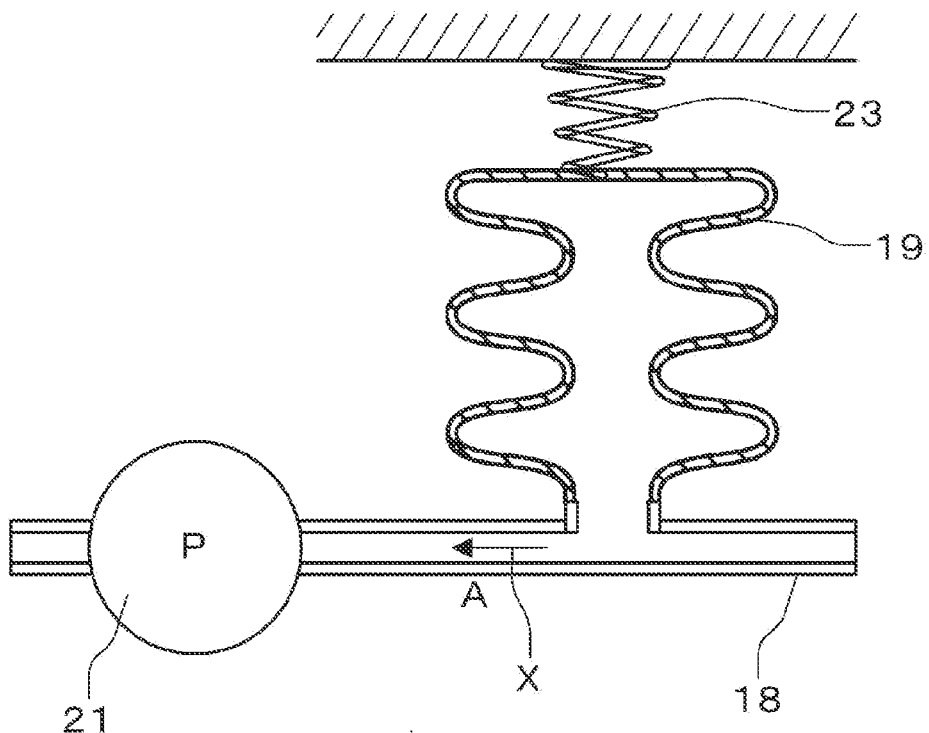

FIGS. 6A and 6B are cross-sectional views illustrating the operation of the inlet flow passage-side volume adjusting chamber according to this embodiment. To be more specific, FIGS. 6A and 6B show a state in which the inlet flow passage-side volume adjusting chamber 19 moves to a movement end position. For example, in a case where the volume of the inside of the fluid flow member 18 increases, as shown in FIG. 6A, the cooling liquid X inside the inlet flow passage-side volume adjusting chamber 19 flows into the inside of the fluid flow member 18 due to the contraction of the inlet flow passage-side volume adjusting chamber 19. The cooling liquid X flows inside the fluid flow member 18 in a direction denoted by arrow A shown in FIG. 6A and flows into the pump 21.

In a case where the volume of the inside of the fluid flow member 18 decreases (initial state), as shown in FIG. 6B, the cooling liquid X inside the fluid flow member 18 flows into the inside of the inlet flow passage-side volume adjusting chamber 19 due to the expansion of the inlet flow passage-side volume adjusting chamber 19.

In the above-described embodiment, although the inlet flow passage-side volume adjusting chamber 19 is configured by one bellows, the number of the bellows is not limited to one and may be two or more.

Configuration of Pump

Figure 7:
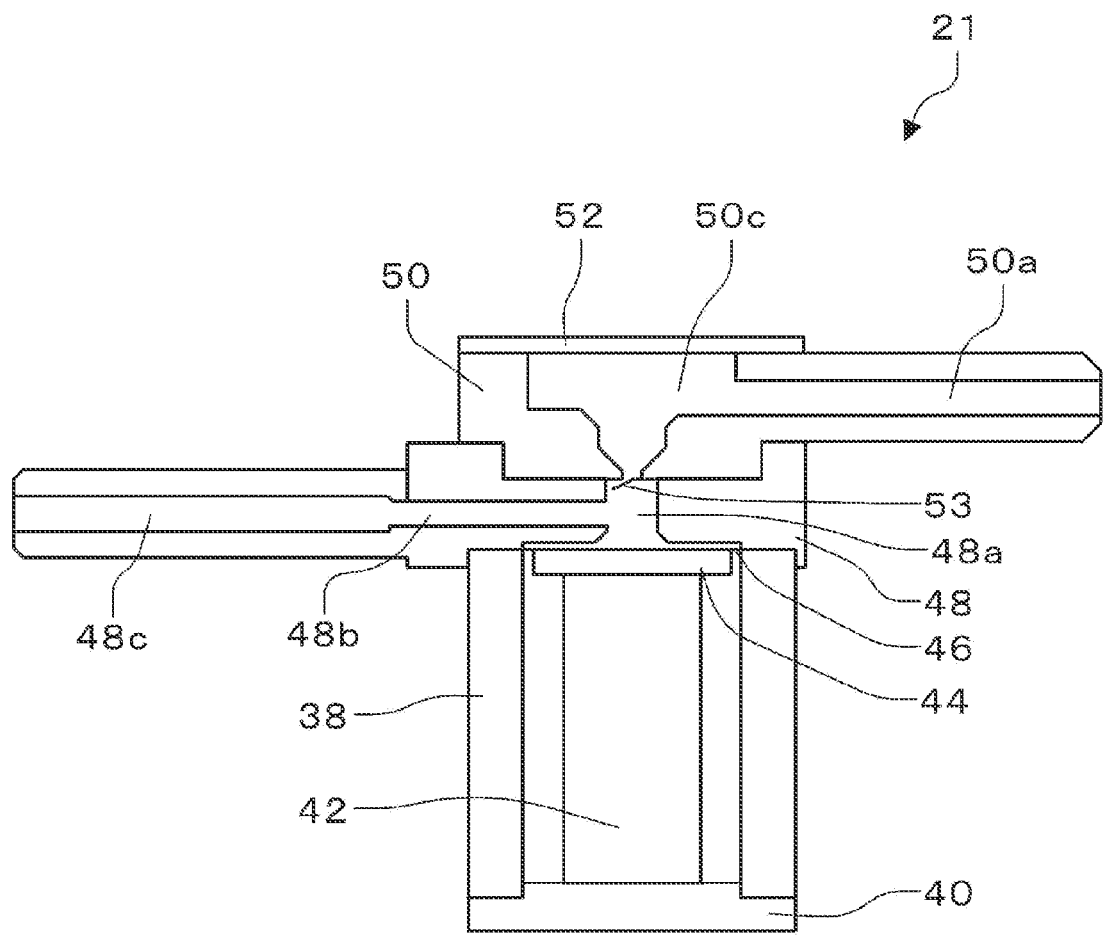
FIG. 7 is a cross-sectional view of a pump according to the second embodiment.

FIG. 7 is a cross-sectional view of a pump 21 according to this embodiment. A base plate 40 is firmly fixed, for example by welding, to a lower portion of a casing 38 that is a holding member for a lamination-type piezoelectric device 42. A reinforcing plate 44 is bonded to an upper face of the lamination-type piezoelectric device 42 as a driving source of the pump in advance so as to form a lamination-type piezoelectric device unit, and the lamination-type piezoelectric device 42 is fixed to the inside of the casing 38. The lamination-type piezoelectric device 42 is fixed by bonding to both the lower face of the lamination-type piezoelectric device 42 and the upper face of the base plate 40.

After the lamination-type piezoelectric device 42 is fixed, the upper face of the casing 38 and the upper face of the reinforcing plate 44 are processed so as to be in the same plane through a grinding process. When the above-described processing is performed, a center value of the driving voltage for the lamination-type piezoelectric device 42 at a time when the piezoelectric device is being driven is applied to the lamination-type piezoelectric device 42. Accordingly, there is a level difference between the upper faces of the lamination-type piezoelectric device 42 and the reinforcing plate 44 in a state in which a voltage is not applied to the lamination-type piezoelectric device 42.

After the grinding process, a diaphragm 46 is bonded to both the reinforcing plate 44 and the casing 38. While the diaphragm 46 is formed by a stainless steel thin plate having a thickness of 20 μm (in this example), a resin film is attached to the upper face located on the side opposite to the lower face that is bonded to the reinforcing plate 44 and the casing 38. A pump chamber member 48 is mounted such that the diaphragm 46 is interposed between the casing 38 and the pump chamber member 48. The casing 38 is formed such that the casing 38 is slightly larger than the shape of the inner circumferential portion of the outer circumferential fixing portion of the diaphragm 46 of the pump chamber member 48.

On the inside of the pump chamber member 48, a pump chamber 48a, a tubule portion 48b, and an outlet connection pipeline (outlet flow passage) 48c are formed. The casing 38 and the pump chamber member 48 are fixed through a screw not shown in the figure. In the upper portion of the pump chamber member 48, an inlet flow passage member 50 is fitted and is fixed by a screw not shown in the figure. The volume of the pump chamber 48a is changed by driving the diaphragm 46. The outlet connection pipeline 48c allows fluid to flow out from the pump chamber 48a.

The upper face of the inlet flow passage member 50 that is open is sealed by a vibration plate (pressure adjusting element) 52 that is flexible and has a high gas barrier property. The vibration plate 52 adjusts the volume of a buffer chamber 50c. The volume of the buffer chamber 50c is adjusted by changing the shape of the vibration plate 52. The vibration plate 52 is formed by a member having elasticity. As the material of the vibration plate 52, in order to acquire both flexibility and the gas barrier property, a composite material of a metal (for example, stainless steel, aluminum, or the like) thin film and a resin may be used. Furthermore, the material of the vibration plate 52 may be a soft tube acquired by attaching a PVC film to the ceiling of the buffer chamber 50c or a silicon resin. On the surface of the vibration plate 52, a folding or fold that is expandable and contractible or a concentric ripple shape may be formed, or the surface of the vibration plate 52 may be formed to have a bellows structure. The bellows structure may be formed in a spiral shape or independent bellows.

A reed valve 53 is disposed between the inlet flow passage 50a and the pump chamber 48a and is configured to open or close the inlet flow passage 50a.

The inlet flow passage 50a allows a fluid to flow into the pump chamber 48a. An input pipeline that is not shown in the figure is connected to a protruded portion of the inlet flow passage member 50 in which the inlet flow passage 50a is disposed, and, similarly, an outlet pipeline that is not shown in the figure is connected to a protruded portion of the pump chamber member 48. The inlet pipeline and the outlet pipeline are configured by resin tubes having appropriate flexibility or the like.

Next, a flow passage located inside the pump according to this embodiment will be described. The fluid flowing from the inlet pipeline that is not shown in the figure flows from the buffer chamber 50c into the pump chamber 48a. The flow passage to the pump chamber 48a of the buffer chamber 50c gradually decreases so as to have a hole of about ϕ0.5 mm (in one example) and connects with the pump chamber 48a. In a boundary portion between the buffer chamber 50c and the pump chamber 48a, a reed valve (fluid resistance element) 53 operates as a check valve by a stainless steel thin plate having a thickness of 15 μm. The reed valve 53 is installed and is configured to prevent a reverse flow from the pump chamber 48a to the buffer chamber 50c.

The pump chamber 48a is configured by a connection portion at which the tubule portion 48b is open and a flat-shaped compressed portion of the upper portion of the diaphragm 46. The fluid flowing out from the pump chamber 48a is delivered to the connection pipeline, which is not shown in the figure, through the tubule portion 48b and the outlet connection pipeline 48c.

Operation of Pump

The operation of the pump 21 according to this embodiment will be described. An inertance value L of a flow passage will be defined. Assuming that the cross-sectional area of a flow passage is S, the length of the flow passage is 1, and the density of the operating fluid is ρ, the inertance value L is given as $L=\rho \times l/S$. In a case where differential pressure of the flow passage is ΔP and the flow amount flowing through the flow passage is Q, by transforming an equation of motion of the fluid inside the flow passage using the inertance value L, a relationship of $\Delta P = L \times dQ/dt$ is derived.

In other words, the inertance value L represents the degree of influence of unit pressure on a time change in the flow amount. Thus, the larger the inertance value L is, the less the time change in the flow amount is. On the other hand, the smaller the inertance value L is, the greater the time change in the flow amount is.

A combined inertance value relating to a parallel connection of a plurality of flow passages or a serial connection of a plurality of flow passages having different shapes may be calculated by combining inertance values of individual flow passages similarly to a parallel connection or a serial connection of inductors in an electric circuit. To be more specific, a combined inertance value in a case where a plurality of flow passages are connected in parallel can be acquired by combining individual inertance values similarly to a case where inductors are connected in parallel in an electric circuit. On the other hand, a combined inertance value in a case where a plurality of flow passages having different shapes are connected in series can be acquired by combining individual inertance values similarly to a case where inductors are connected in series in an electric circuit.

In a case where there is a pressure adjusting element such as a flexible unit in a flow passage, the combined inertance value may be calculated in consideration of the pressure adjusting element. Accordingly, in the pump according to this embodiment, the combined inertance value of the inlet flow passage is a combined inertance value from the pressure adjusting plate 52 as the pressure adjusting element to the reed valve 53. On the other hand, the combined inertance value of the outlet flow passage is a sum of the inertance value of the tubule portion 48b and inertance value of the outlet connection pipeline 48c. Since the length of the flow passage of the outlet flow passage is longer than that of the inlet flow passage, and the cross-sectional area of the flow passage of the outlet flow passage is smaller than that of the inlet flow passage, the combined inertance value of the outlet flow passage is larger than that of the inlet flow passage.

Third Embodiment

Configuration of Cooling System

Figure 8:
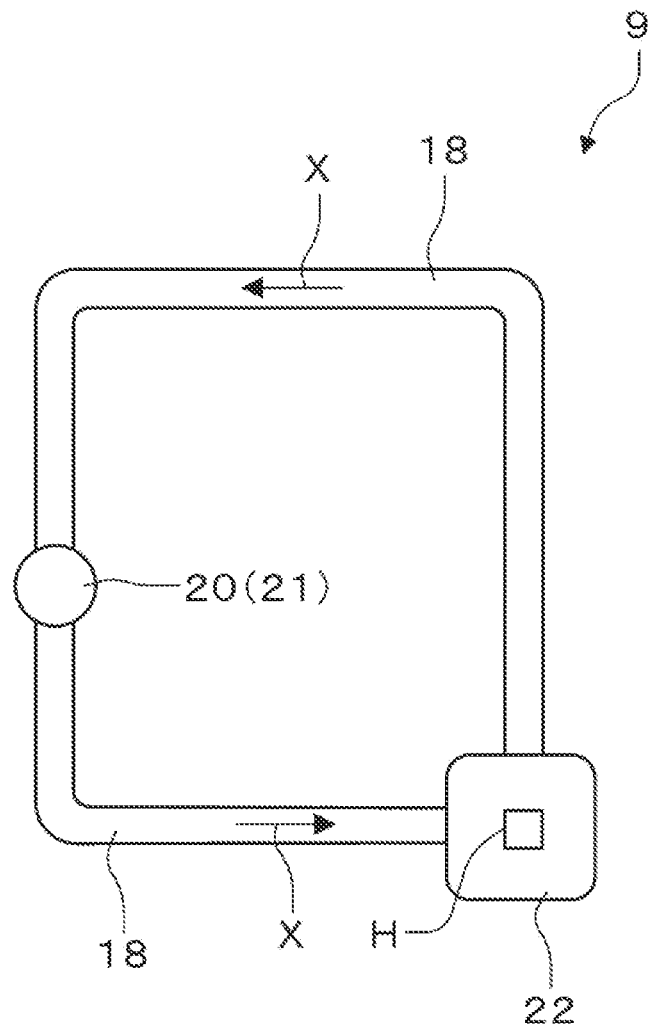
FIG. 8 is a schematic diagram schematically showing the configuration of a cooling system according to a third embodiment.

FIG. 8 is a schematic diagram schematically showing the configuration of a cooling system 9 according to a third embodiment. In the description of this embodiment, the same reference numerals are assigned to the same configuration as that of the first embodiment, and the description thereof is omitted.

The cooling system (cooling device) 9 according to this embodiment is used for cooling a heat producing body H through a cooling medium X. The cooling system 9, as shown in FIG. 8, is configured so as to include a fluid flow member (tube) (circulation flow passage) 18, a pump 20 (21), and a heat receiving unit 22. This is a configuration acquired by omitting the heat radiating unit, the cooling medium cooling unit, the motor control unit, the temperature sensor, and the temperature managing unit from the first embodiment. In other words, the heat of the cooling medium X after cooling the heat producing body H is given to the outside of the fluid flow member 18 by the cooling medium X through the fluid flow member 18. In this case, by adjusting the length of the fluid flow member 18, the cooling medium X after cooling the heat producing body H can be at desired temperature. The fluid flow member 18 and the pump 20 (21) are disposed at a position, at which the ventilation is good, inside the projector in one embodiment.

Modified Example 1

Figure 9:
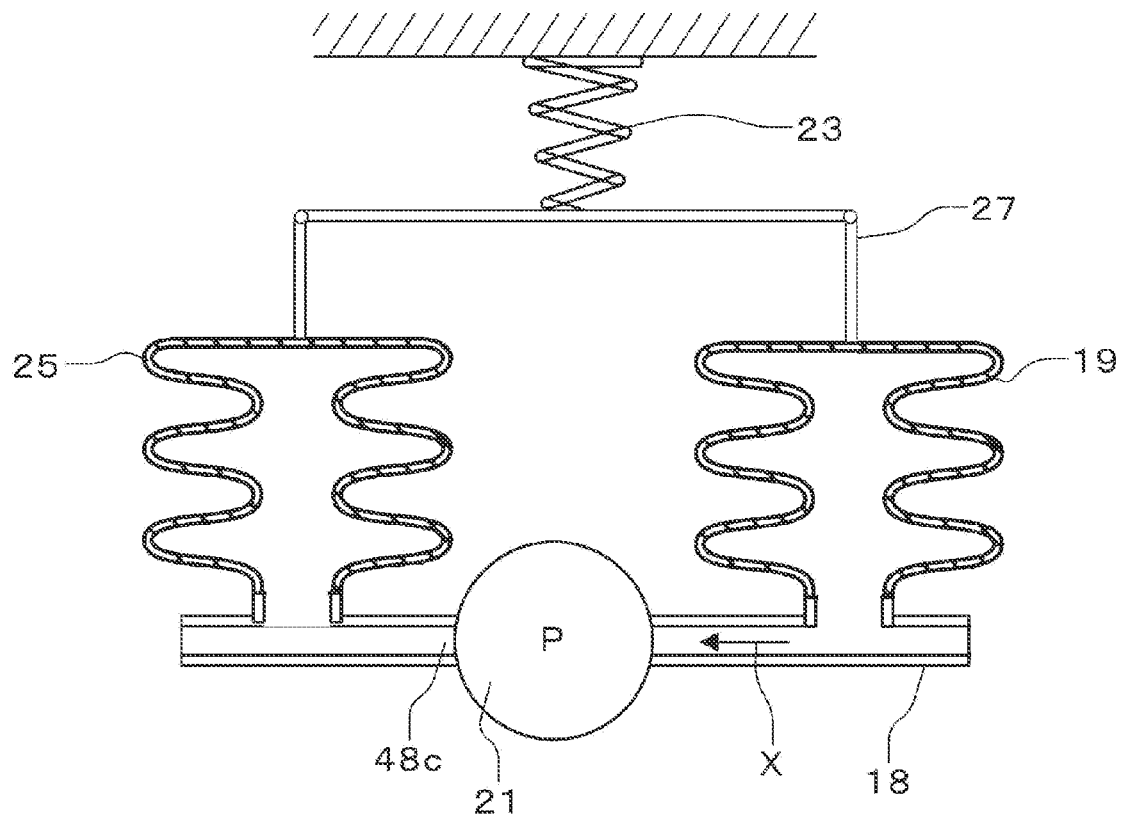
FIG. 9 is a cross-sectional view of a volume adjusting chamber according to Modified Example 1.

FIG. 9 is a cross-sectional view of a volume adjusting chamber according to this modified example. This modified example has a configuration in which an outlet flow passage-side volume adjusting chamber (second volume adjusting chamber) 25 is added to the configuration of the above-described embodiment.

The outlet flow passage-side volume adjusting chamber 25 is disposed on a side of the fluid flow member 18 that is located at the outlet connection pipeline (outlet flow passage) 48c side. The outlet flow passage-side volume adjusting chamber 25 is used for absorbing a pulsatile flow of the cooling liquid X that flows out from the pump 21. The inlet flow passage-side volume adjusting chamber 19 and the outlet flow passage-side volume adjusting chamber 25 are disposed so as to be in parallel with the pump 21. The outlet flow passage-side volume adjusting chamber 25 is an expandable and contractible pipe that is formed in a bellows shape.

The inlet flow passage-side volume adjusting chamber 19 and the outlet flow passage-side volume adjusting chamber 25 are connected to one spring 23 through a scale 27. By changing the position of the spring 23 of the scale 27, forces can be delivered to the inlet flow passage-side volume adjusting chamber 19 and the outlet flow passage-side volume adjusting chamber 25 with balance. The inlet flow passage-side volume adjusting chamber 19 and the outlet flow passage-side volume adjusting chamber 25 are dynamically connected, and balance therebetween is acquired even when the internal cooling liquid X decreases. The inlet flow passage-side volume adjusting chamber 19 may be flexibly transformed with a material softer than that of the outlet flow passage-side volume adjusting chamber 25.

Modified Example 2

Figure 10:
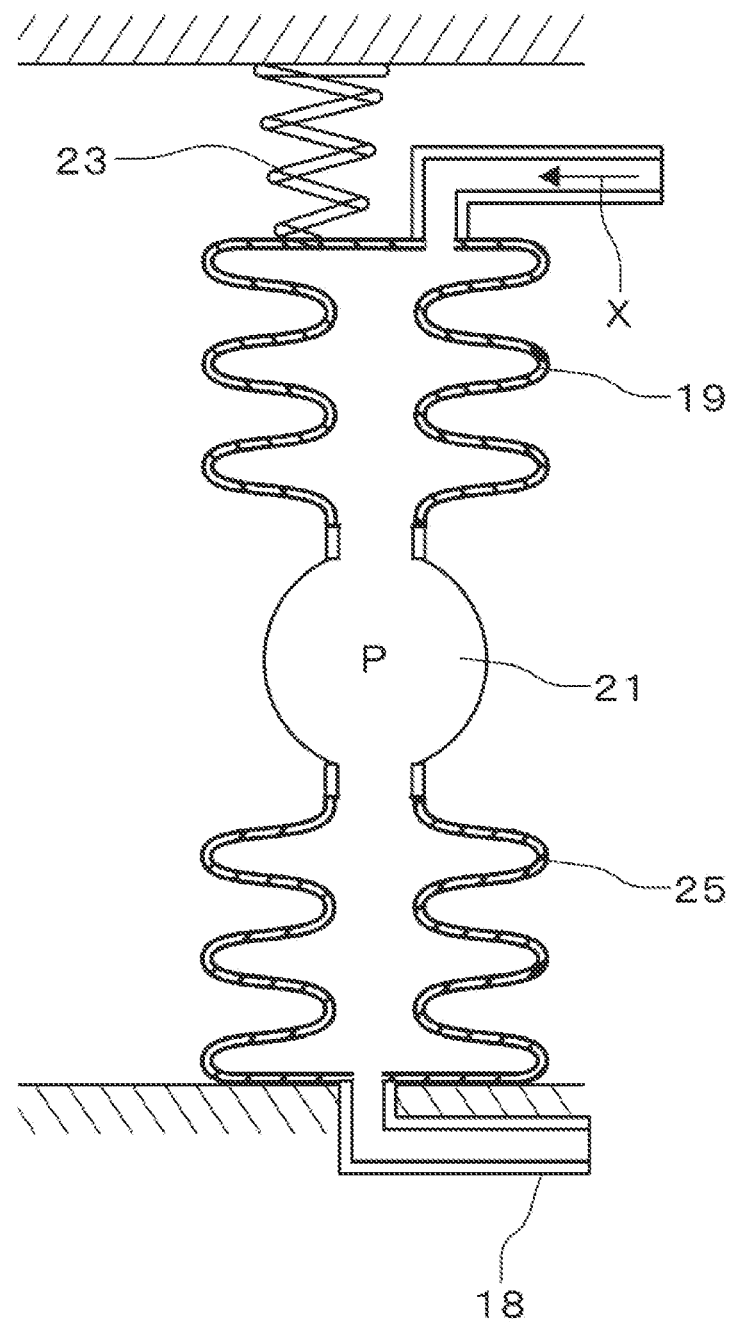
FIG. 10 is a cross-sectional view of a volume adjusting chamber according to Modified Example 2.

FIG. 10 is a cross-sectional view of a volume adjusting chamber according to this modified example. In this modified example, the inlet flow passage-side volume adjusting chamber 19 and the outlet flow passage-side volume adjusting chamber 25 are disposed in series with respect to the pump 21. The inlet flow passage-side volume adjusting chamber 19 and the outlet flow passage-side volume adjusting chamber 25 are connected by one spring 23. By interposing the pump 21 between the inlet flow passage-side volume adjusting chamber 19 and the outlet flow passage-side volume adjusting chamber 25, it is difficult for vibration to be propagated to the outside, whereby it can be in a quiet state.

Modified Example 3

Figure 11:
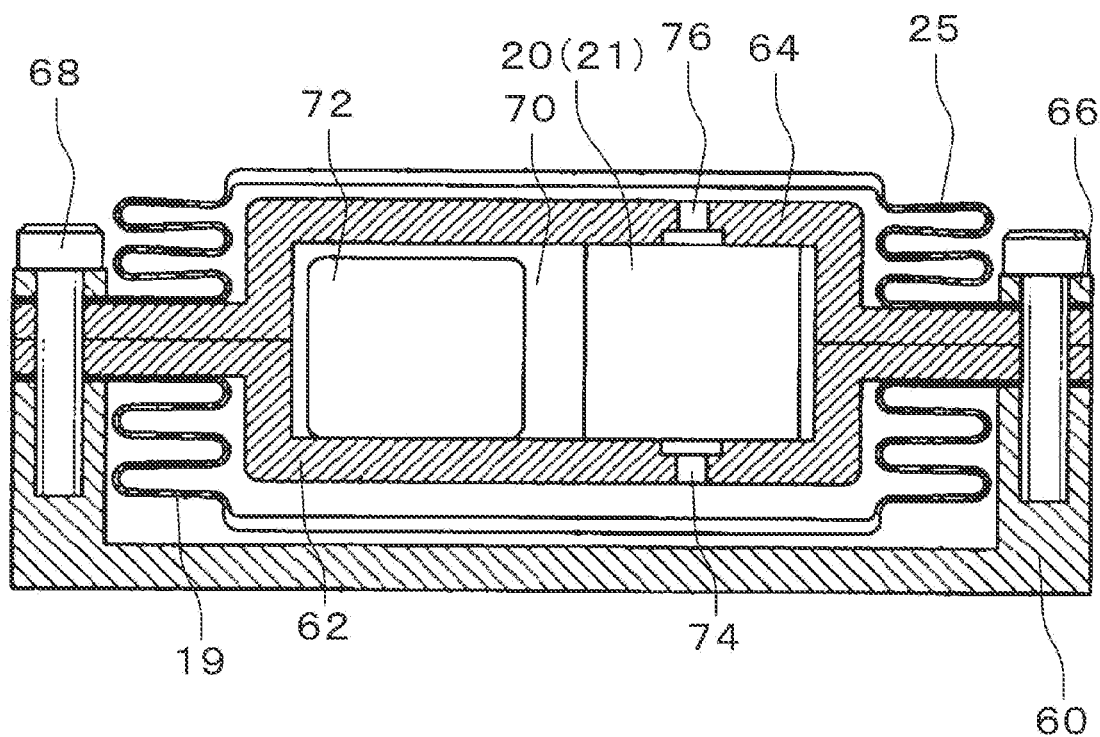
FIG. 11 is a cross-sectional view of a volume adjusting chamber according to Modified Example 3.
Figure 12A:
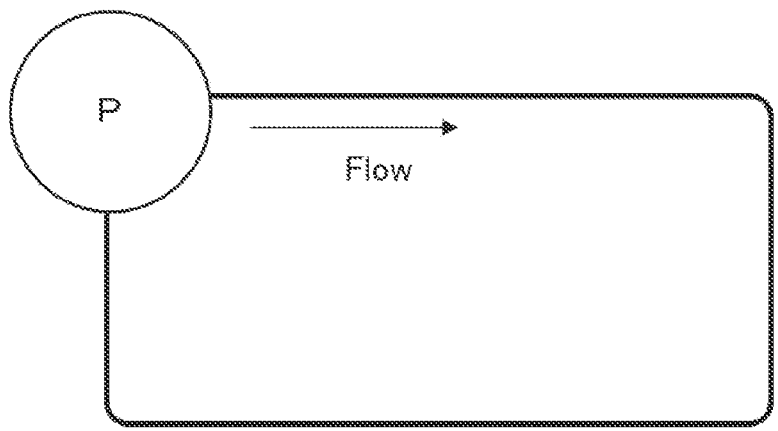
FIGS. 12A and 12B are diagrams showing a general cooling system.
Figure 12B:
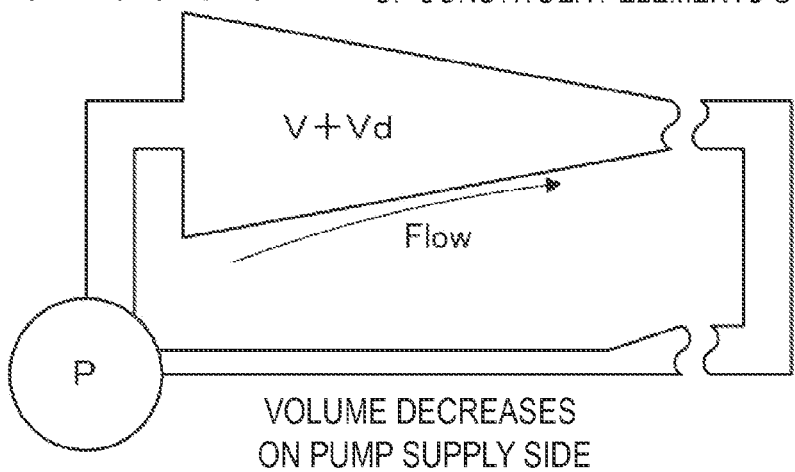

FIG. 11 is a cross-sectional view of a volume adjusting chamber according to this modified example. In this modified example, the pump 20 (21) is disposed so as to be covered with the inlet flow passage-side volume adjusting chamber 19 and the outlet flow passage-side volume adjusting chamber 25. On the upper face of a cylinder-shaped base unit 60 having a bottom portion, the inlet flow passage-side volume adjusting chamber 19, the inlet flow passage-side volume adjusting chamber-side sealing case 62, an outlet flow passage-side volume adjusting chamber-side sealing case 64, and the outlet flow passage-side volume adjusting chamber 25 are sequentially overlapped, and edge portions thereof are pressed by a ring member 66. A plurality of bolts 68 are used for fixing the ring member.

In addition, the pump 20 (21) and a pump driving circuit 72 are fixed to a pump unit storing chamber 70 that is configured by an inlet flow passage-side volume adjusting chamber-side sealing case 62 and the outlet flow passage-side volume adjusting chamber-side sealing case 64. In the inlet flow passage-side volume adjusting chamber-side sealing case and the outlet flow passage-side volume adjusting chamber-side sealing case 64, flow passages 74 and 76 that communicate with the pump 20 (21) are disposed.

Other Modified Examples

Although a transmissive-type liquid crystal panel (liquid crystal light valve 12) is used in the above-described embodiments, the invention is not limited thereto. Thus, a reflective-type liquid crystal panel may be used, or a digital micro-mirror device may be used.

In the above-described embodiments, although a configuration is employed in which three liquid crystal light valves 12 are disposed, the invention is not limited thereto, and a configuration may be employed in which only one liquid crystal light valve 12 is disposed.

In the above-described embodiment, although an example is shown in which a front-type projector that performs projection from a direction for observing the screen is used, an embodiment of the invention can be applied to a rear-type projector that performs projection on a side opposite to the direction for observing the screen.

In the above-described embodiments, although the projector is used, the invention is not limited thereto. Thus, the cooling system according to one of the embodiments can be used in the other electronic apparatuses such as a personal computer including a CPU (Central Processing Unit) or the like, a printer, or a medical apparatus (for example, an electronic thermometer, a sphygmomanometer, a blood glucose meter, an electrocardiographic display apparatus, or an ultrasonic diagnosis apparatus).

In the above-described embodiments, the cooling medium cooling unit 26 has been described as configured by the fan driving motor 34 and the fan 36. However, an embodiment of the invention is not limited thereto, and a Peltier device or the like can be used as the cooling medium cooling unit 26.

The inlet flow passage-side volume adjusting chamber 19 and the outlet flow passage-side volume adjusting chamber 25 may be air cylinders, diaphragms, or containers each formed from a film that is acquired by performing lamination processing for a general synthetic resin or an aluminum foil. The inlet flow passage-side volume adjusting chamber 19 and the outlet flow passage-side volume adjusting chamber 25 are not particularly limited as long as they are devices that convert air pressure into a driving force.

What is claimed is:

1. A cooling device comprising:
a pump chamber of which a volume can be changed;
an inlet flow passage configured to allow a fluid to flow into the pump chamber;
an outlet flow passage configured to allow the fluid to flow out from the pump chamber;
a fluid resistance element configured to open or close between the inlet flow passage and the pump chamber;
a circulation flow passage that is used for circulating the fluid from the outlet flow passage to the inlet flow passage;
a first volume adjusting chamber disposed in the circulation flow passage and upstream of the inlet flow passage;
a second volume adjusting chamber disposed in the circulation flow passage and downstream of the outlet flow passage; and
a connecting unit located outside of the circulation flow passage and configured to connect the first volume adjusting chamber and the second volume adjusting chamber,
the first volume adjusting chamber including a first movable portion which adjusts the volume of the first volume adjusting chamber and the second volume adjusting chamber including a second movable portion which adjusts the volume of the second volume adjusting chamber,
wherein a movement of the first movable portion and a movement of the second movable portion are coordinated with each other through the connecting unit.

2. The cooling device according to claim 1, wherein the connecting unit includes a spring and a scale.

3. The cooling device according to claim 1, wherein the first volume adjusting chamber and the second volume adjusting chamber are disposed in a parallel pattern or a serial pattern.

4. The cooling device according to claim 1, wherein the first volume adjusting chamber and the second volume adjusting chamber each have an expandable and contractible structure.

5. The cooling device according to claim 4, wherein each expandable and contractible structure comprises at least one fold.

6. The cooling device according to claim 1, wherein a pressure change of the fluid in the entire circulation flow passage is $\Delta P$ at a time of circulating the fluid, a volume change of the entire circulation flow passage at the time is $\Delta V$, and pressure of the fluid of the outlet flow passage-side circulation flow passage at the time of circulating the fluid is $P_S$, the volume of the first volume adjusting chamber is an adjustment volume $V_B$ that satisfies: $V_B > \frac{1}{2} \cdot P_S \cdot \Delta V / \Delta P$.

7. A projector comprising:
the cooling device according to claim 1.

8. A projector comprising:
the cooling device according to claim 2.

9. A projector comprising:
the cooling device according to claim 3.

10. A projector comprising:
the cooling device according to claim 4.

11. A projector comprising:
the cooling device according to claim 5.

12. A projector comprising:
the cooling device according to claim 6.

* * * * *